W. W. WHITE.
APPARATUS FOR OPERATING WATER WHEEL GATES.
APPLICATION FILED MAY 7, 1908.

959,280. Patented May 24, 1910.

Witnesses
A. D. Tolman
Penelope Comberbach

Inventor
William W. White.
By Rufus B. Sowle
Attorney

UNITED STATES PATENT OFFICE.

WILLIAM W. WHITE, OF WORCESTER, MASSACHUSETTS, ASSIGNOR TO HOLYOKE MACHINE COMPANY, OF WORCESTER, MASSACHUSETTS, A CORPORATION OF MASSACHUSETTS.

APPARATUS FOR OPERATING WATER-WHEEL GATES.

959,280.  Specification of Letters Patent.  Patented May 24, 1910.

Application filed May 7, 1908. Serial No. 431,516.

*To all whom it may concern:*

Be it known that I, WILLIAM W. WHITE, a citizen of the United States, residing at Worcester, in the county of Worcester and Commonwealth of Massachusetts, have invented a new and useful Improvement in an Apparatus for Operating Water - Wheel Gates, of which the following is a specification, accompanied by drawings forming a part of the same, in which—

Figure 1:
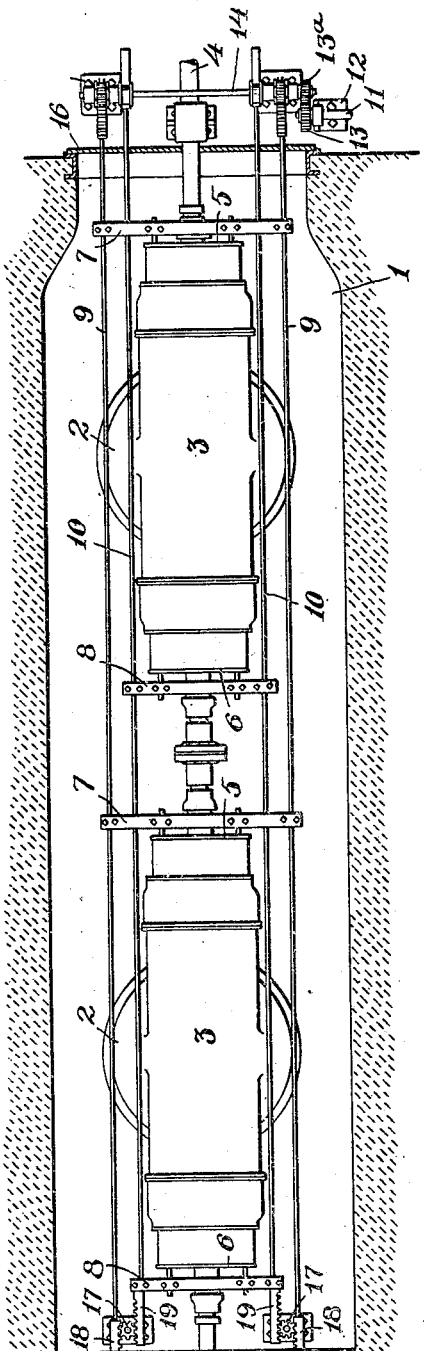
Figure 2:
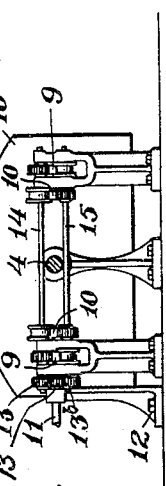

Figure 1 is a top plan view of my improved apparatus applied to a series of water wheels, and Fig. 2 is an end view of the same.

Similar reference figures refer to similar parts in the different views.

My invention relates to apparatus for operating to open and close in unison the gates of a series of individual water wheels, and consists in the construction and arrangement of parts as hereinafter described and pointed out in the annexed claims.

I have shown my apparatus arranged to open and close the gates of two water wheels in the same horizontal plane, but it is equally applicable to any desired number, all that is necessary being to lengthen the connections between the gates as the number of water wheels is increased.

Referring to the accompanying drawings 1 is a penstock to which water is admitted from a canal, not shown. The water wheels, in this instance two in number, are located in casings 3 and are arranged to receive the water from the penstock 1 through openings at opposite ends of the casings 3 communicating with the penstock 1. The water is conducted from the penstock 1 upon the water wheels in the casings 3, thereby driving the shaft 4 in the well known manner, and thence passes down through the draft tubes 2. The openings of the casings 3 are provided with gates 5 and 6 which are actuated by the movements of cross bars 7 and 8, connected with rods 9, 9, and rods 10, 10, arranged in pairs on each side of the casing through the penstock 1. The cross bars 7 are connected with the pair of rods 9 and the cross bars 8 are connected with the pair of rods 10. The pair of rods 9 and the pair of rods 10 are arranged to move simultaneously in opposite directions, as will be explained later, and to effect the simultaneous opening and closing of the gates 5 and 6 by the movement in opposite directions of the cross bars 7 and 8.

Situated outside of the penstock 1 and at one end thereof is a shaft 11 transverse to the penstock 1 and journaled in a standard 12. Mounted upon the shaft 11 is a gear 13 at one side of and in engagement with gears 13ª and 13ᵇ on the shafts 14 and 15 respectively. The shaft 11 is arranged to be operated by any convenient source of power, not shown, whenever it is desired to operate the gates.

The pairs of rods 9 and 10 extend beyond the penstock 1 through a plate 16, and are operatively connected to the shafts 14 and 15 by rack and pinion connection, shown in Fig. 2. The pair of rods 9 is connected with pinions on the shaft 14 and the pair of rods 10 with the shaft 15, so that the rods 9 and the rods 10 move in opposite directions when the shaft 11 is rotated. The pairs of rods 9 and 10 extend longitudinally throughout the penstock, being connected with the various pairs of gates, as has been described.

At the farther end of the penstock vertical pinions 17 are provided between the rods 9 and 10 on each side of the penstock 1, which are arranged to be simultaneously engaged by racks 18 and 19 on the rods 9 and 10. This insures the simultaneous movement of the ends of the rods 9 and 10 at the farther end of the penstock, and also provides a drawing or tensile strain upon either of the pair of rods 9 or 10, whether the rods are moved to open or to close the gates. I thereby prevent all buckling or bending of the rods caused by pushing strains incident to the movement of the gates, and am enabled to use rods of much less area in cross section, for example, when the shafts 14 and 15 are rotated to pull the rods 9, the geared connection between the rods 9 and the rods 10, by means of the pinions 17 and the racks 18 and 19, will cause a pulling or tensile strain to be applied to the rods 10 to move them in the opposite direction, and likewise a pulling or tensile strain applied to the rods 10 by the rotation of the shafts 14 and 15 will cause a pulling or tensile strain to be applied to the opposite ends of the rods 9.

I claim,

1. In an apparatus of the class described, the combination of water wheel gates, a pair of rods on both sides of said water wheel operatively connected to open and close said gates, means at one end of said rods arranged to move said rods simultaneously in opposite directions, and a pinion interposed between and in engagement with the other end of said rods beyond said water wheel gates, whereby the motion of the end of one rod in one direction is transmitted to the end of the other rod in the other direction.

2. In an apparatus of the class described, the combination of a series of water wheels provided with gates, a pair of horizontal rods on both sides of said water wheels operatively connected to open and close said gates, means at one end of said rods arranged to move the rods of each pair simultaneously in opposite directions, and a vertical shaft provided with a pinion between the opposite ends of each pair of rods beyond said series of water wheels, with said opposite ends in engagement with opposite sides of said pinion, whereby the motion of the end of one rod of each pair in one direction is transmitted to the end of the other rod of the same pair in the other direction.

Dated this fifth day of May 1908.

WILLIAM W. WHITE.

Witnesses:
PENELOPE COMBERBACH,
HENRY WOOD FOWLER.